A. H. ASPROOTH & H. H. BENSON.
FLUID CLUTCH.
APPLICATION FILED AUG. 19, 1915.

1,195,956.

Patented Aug. 29, 1916.
4 SHEETS—SHEET 1.

Witness
W. L. Dow

Inventors
Axel H. Asprooth
H. H. Benson
By Pond & Wilson Attys.

UNITED STATES PATENT OFFICE.

AXEL HJ. ASPROOTH AND HARRY H. BENSON, OF ROCKFORD, ILLINOIS.

FLUID-CLUTCH.

1,195,956.  Specification of Letters Patent.  Patented Aug. 29, 1916.

Application filed August 19, 1915.  Serial No. 46,311.

*To all whom it may concern:*

Be it known that we, AXEL HJ. ASPROOTH and HARRY H. BENSON, citizens of the United States, residing at Rockford, in the county of Winnebago and State of Illinois, have invented certain new and useful Improvements in Fluid-Clutches, of which the following is a specification.

This invention relates to the general art of clutches for transmitting power from a driving to a driven member, and has reference more particularly to clutches of that type wherein the power is transmitted through the agency of a suitable fluid, such as oil. Clutches of this general character are commonly known as fluid clutches.

The present invention aims to provide a clutch of this character which shall be particularly adapted for use in automobiles and similar motor vehicles, and the primary object of the invention is to provide a clutch which will be capable of transmitting power from the driving to the driven member at any desired or predetermined speed ratio, with certainty and reliability of action, and with a minimum of wear upon the operating parts of the clutch mechanism. A clutch wherein the drag of the load can be imparted to the engine shaft so gradually as to obviate the necessity of employing variable speed transmission gearing has long been recognized as a great desideratum, especially, in the art of automobiles. So far as we are aware, however, the development of mechanical clutches has never reached this point, due mainly to the fact that any attempt to effect, through the agency of the clutch alone, a gradual acceleration of the speed of the vehicle from starting position, or to ease the load on the engine in hill climbing and impose it so gradually as to avoid stalling the engine, is accompanied by such severe wear on the clutch mechanism that the latter is very short lived; and hence resort is had to the expedient of valuable speed transmission to avoid rapid deterioration and wearing out of the clutch mechanism.

One of the main objects we have had in view in designing and perfecting the fluid clutch of the present invention is to provide a clutch mechanism of such a durable structure, so free from frictional wear, and capable of such perfect manual control that the work may be imposed upon the engine so gradually or in such a ratio to the time period of its performance as to dispense with the necessity of employing variable speed transmission gearing in addition to the clutch mechanism, and at the same time without involving any likelihood of stalling the engine through imposition of an excessive load at any instant in the operation of the engine.

Other minor objects and many of the attendant advantages of the invention will be apparent to those acquainted with the art of clutch-controlled power transmission from a consideration of the following detail description, taken in connection with the accompanying drawings, wherein we have illustrated one practical embodiment of the invention, the efficiency of which has been proved by a practical test, and in which—

Referring now to the drawings, reference character 18 designates the driving shaft which may be the engine shaft of an automobile, secured to which by a flange 19 and machine screws 20 is a generally cup-shaped member 21 forming one-half of the clutch casing, its other or coöperating half being a similarly shaped member 22, and the two parts being strongly united by peripheral through-bolts 23. The meeting faces of the members 21 and 22 are preferably formed with a tongue and groove joint including a gasket 24, as clearly shown in Fig. 1. The member 22 is formed with a central laterally extending hub 25, more particularly referred to hereinafter.

Figure 10:
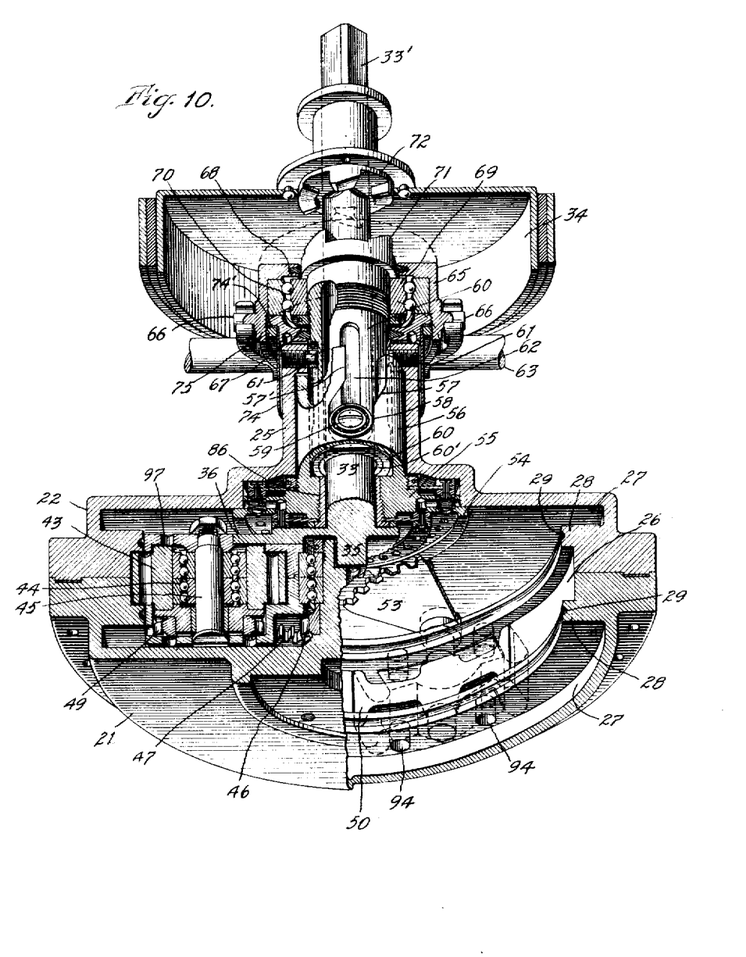
Fig. 10 is an end perspective view, mainly in axial section, with parts broken out and other parts omitted, as viewed from the right of Fig. 1.
Figure 11:
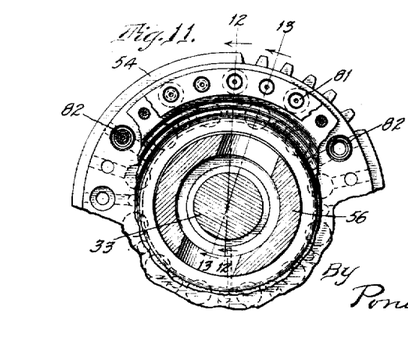
Fig. 11 is a sectional detail, enlarged, on the line 11—11 of Fig. 1.
Figure 12:
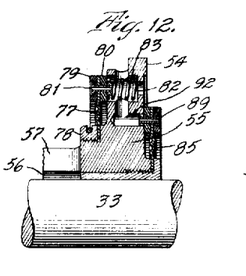
Figs. 12 and 13 are sectional details on corresponding lines of Fig. 11.
Figure 13:
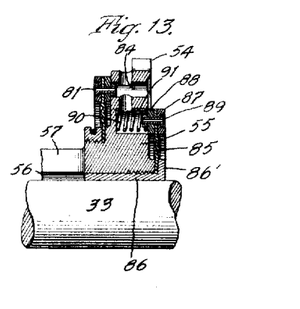

The outer casing members 21 and 22, which unitedly form the main driving member of the clutch proper, are so cored as to provide in combination with the main driven member or rotor hereinafter described, a central annular liquid chamber 26 and side liquid chambers 27; the casing having a pair of narrow internal, annular side flanges 28 between said central and side liquid chambers, the inner faces of which flanges are grooved or channeled as indicated at 29 (see Fig. 10). The outer casing member 21 is formed with a central inwardly extending hub 30 provided with a socket 31 at its free end and an axial duct 32.

33 designates the driven or transmission shaft on which may be mounted a brake drum 34. Shaft 33 is formed at its inner end with a centering boss 35 that loosely fits in socket 31, and also with a radially extending wide flange or disk 36, to which latter is secured, by means of through-bolts 37 and 38 (Fig. 6), a pair of skeleton frame plates or blocks 39 and 40 that are also securely bonded together by said bolts 37 and 38 and unitedly constitute the main inner or driven member or rotor of the clutch, the same being journaled upon the hub 30 of the main outer or driving member by a ball-bearing 41, clearly shown in Figs. 1, 6, and 7.

Figures 1, 2, 3, 4:
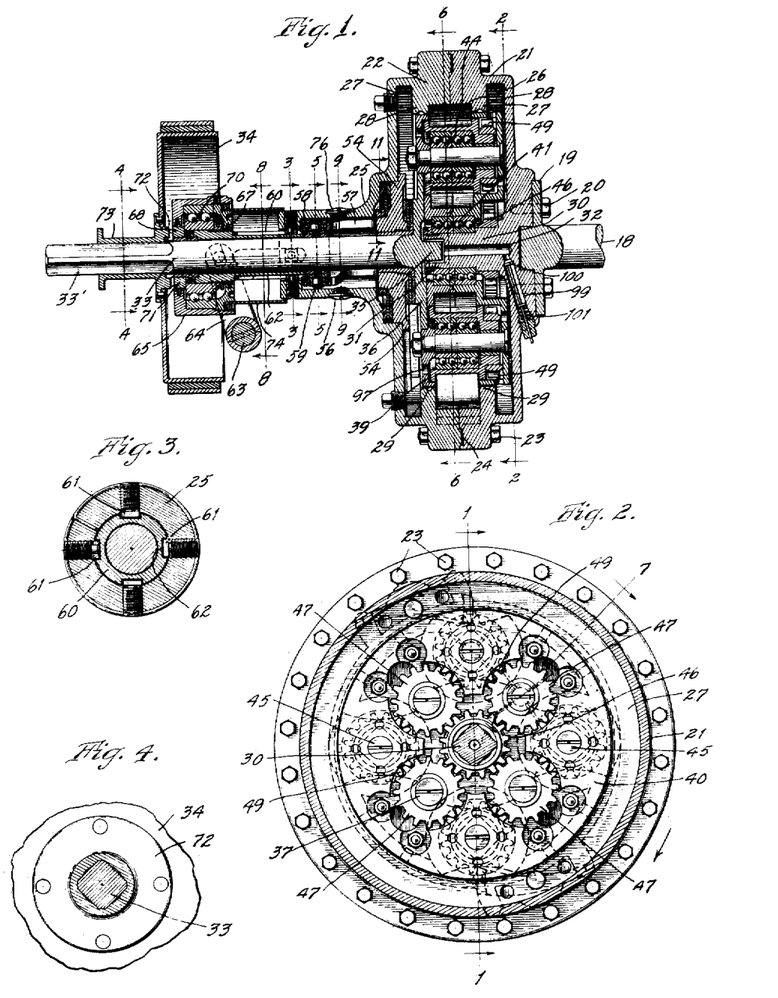
Figure 1 is an axial section through our improved fluid clutch and its operating mechanism, as applied to an automobile, showing also fragments of the engine and transmission shafts and the brake, as seen on the section line 1—1 of Fig. 2.
Figs. 2, 3, 4, 5, and 6 are sectional views at right angles to the axis of the clutch taken on the corresponding lines of Fig. 1.
Figure 6:
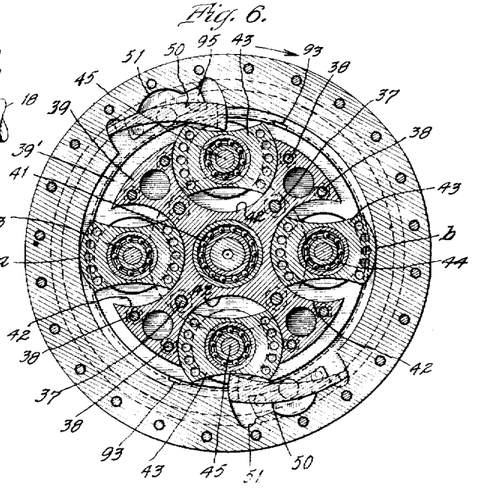
Figure 7:
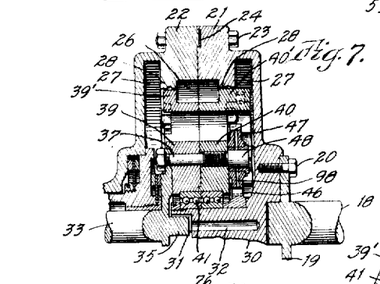
Fig. 7 is a sectional detail view taken on the line 7—7 of Fig. 2.

The driven member comprising the skeleton plates or blocks 39 and 40 is, as best shown in Fig. 6, formed with a series (herein shown as four) of circular recesses 42 located 90 degrees apart, in which are fitted to revolve a corresponding series of segmental propeller blades 43 of a form presenting concave sides and arcuate ends, these blades being journaled through the intermediary of ball-bearings 44 on studs or shafts 45 extending through and between the inner frame plates or blocks 39 and 40. In this connection, it may be noted that the frame plates or blocks 39 and 40 have peripheral flanges 39' and 40' registering with the channeled inner peripheries of the flanges 28 of the outer casing, coöperating with the latter in defining the boundaries of the inner liquid chamber 26 and separating the latter from the outer liquid chambers 27, the channels 29 in flanges 28 forming a pressure-conducting medium as hereinafter described. The segmental propeller blades 43 are rotated on their individual axes, when there is a relative rotary movement existing between the driving and driven shafts and the main clutch members respectively, carried thereby, this rotation of the propeller blades being effected by a system of planetary gearing as follows. Fast on the hub 30 of the outer or driving member is a gear 46 (Fig. 2) that meshes with four idler gears 47, that, as best shown in Fig. 7, are mounted to revolve on bearings 48 formed as a part of the through-bolts 37, said idler gears in turn meshing with gears 49, that, as best shown in Figs. 1 and 10, are fast on the hubs of the segmental propeller blades 43. The relation of the gearing is such that during one complete revolution of the outer or driving member around the inner or driven member carrying the segmental propeller blades, each of the latter revolves once on its own axis in a direction the same as the direction of rotation of the outer driving member.

The major axis of each segmental propeller blade is of such a length that at two diametrically opposite points in the outer circumferential wall of the inner liquid chamber 26 the arcuate ends of each propeller blade will contact with said wall during each complete revolution of the outer or driving member around the inner or driven member, so as to divide or close the annular liquid chamber during this period of the travel, as indicated at the points a and b in Fig. 6; while at the two points half way between said contact points, the minor axis of each segmental propeller blade will coincide with a radius of the driven member. Since the propeller blades are all fixedly geared together with their major axes in parallelism and in a uniform gear ratio to a common driving gear (46), it follows that their major axes will remain in parallelism throughout all their movements. Since the propeller blades are mounted in and carried by the inner or driven member of the clutch, it should be apparent that if the liquid chamber be divided or bisected by a valve or other suitable device carried by the outer or driving member at the same time that said chamber is bisected at another point by one of the propeller blades, the liquid in that portion of the chamber between the two chamber-bisecting members will be trapped so that relative movement between the main driving and driven members of the clutch will be prevented, with the result that the driven shaft 33 will be rotated in the same direction and at the same rate of speed as the driving shaft 18.

Figure 16:
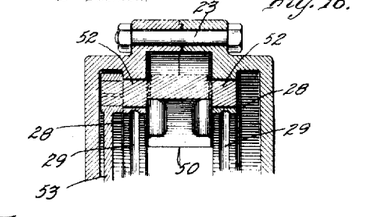

The bisecting of the liquid chamber to lock through the medium of the fluid in the chamber, the propeller blade with respect to the revolving main driving member is effected by means of a pair of oscillating valves 50 that are housed within valve chambers or pockets 51 in the outer peripheral wall of the central liquid chamber 26 and, as shown in Fig. 16, are journaled on trunnions 52 in the flanges 28. Fast on one of the trunnions of each of the valves 52 is a segment gear 53, more clearly shown in Figs. 5 and 10, said segment gears 53 meshing with a central segment gear disk 54 that is integral with a hub member 55 (Figs. 10, 11, 12, and 13) formed on the lower end of a sleeve 56 (Fig. 10). From this it is manifest that a slight oscillating movement imparted to the sleeve 56 about its own axis will effect oscillating movements of the valves 50 between retracted position wherein said valves are wholly within their housings and outside the circular liquid chamber, and projected position wherein said valves are more or less projected across the annular liquid chamber. For the purpose of securing this oscillating movement of the sleeve 56, the same is formed with a pair of inclined or cam slots 57 terminating in outer straight end portion 57' that are engaged by rollers 58 (Fig. 5) mounted on studs 59 secured in a sleeve 60 that is slidingly mounted through an interposed bushing 60' on the driven shaft 33. The sleeve 60 is non-rotatably but slidably connected to the outer hub 25 by anti-friction studs 61 in the latter engaging longitudinal slots 62 in the sleeve 60, as most clearly shown in Figs. 3 and 10. The sleeve 60 is given an endwise movement from a rock shaft 63 (to which the usual foot lever or any other operating device may be applied) through the agency of a forked arm 64 (Fig. 8) fast on the shaft 63, a collar 65 having lateral studs 66 engaged by the forked arm 64, and thrust bearing members 67 and 68, fast with the collar 65 coöperating with a collar 69 that is threaded onto the sleeve 60, collar 65 having an anti-friction bearing 70 on collar 69.

Figure 5:
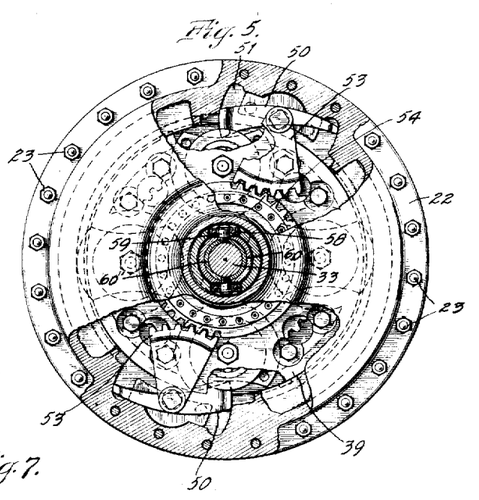

When the shaft 63 has been rocked to its full extent into the position indicated in Fig. 1, the sleeve 60 is drawn outwardly over the driven shaft 33, carrying the rollers 58 to the outer ends of the slots 57, 57' thereby oscillating the sleeve 56 through engagement of the rollers with the cam portions 57 of the slots and, through the described connections, rocking the valves 50 to their fully projected positions as shown in Figs. 5 and 6. When the rock shaft 63 and arm 64 are at their opposite extreme, which is their normal idle position, the rollers 58 are at the inner or opposite ends of the slots, as shown in Fig. 10, and the valves 50 are fully retracted to idle or inoperative position as indicated in Fig. 10. When the shaft 63 and arm 64 are rocked to any intermediate position, the valves 50 are partially projected.

Briefly setting forth the operation of the mechanism as thus far described, and assuming that the entire casing of the clutch which we have referred to as the outer or main driving member is completely filled with a body of suitable liquid, such as oil, which fills the chambers 26 and 27 and floods the main inner or driven member and the propeller blades and gearing carried by the latter, and further assuming that the controlling valves 50 are fully retracted, it will be evident that the rotation of the main outer or driving member will have no propulsive effect upon the inner or driven member, the former merely rotating idly around the latter with an annular body of oil between the two. When now the shaft 63 and arm 64 are rocked toward the position indicated in Fig. 1 by the foot lever of the operator or other suitable agent, the valves 50 are partially projected into the central annular liquid chamber 26, thereby restricting the cross sectional area of the central liquid chamber at these points and tending to rotate the body of liquid. Since the central liquid chamber is also completely bisected by one of the abutment plates 43 during each quarter revolution of the driving member around the driven member, it follows that a rotative impulse will be imparted to the driven member at a slower rate of speed than that of the outer or driving member, the speed of rotation of the inner or driven member depending upon the extent to which the escape of liquid past the valves 50 is choked or throttled by the latter. The greater this choking or throttling effect, the more closely will the speed of rotation of the inner member approach that of the outer member. When the valves 50 are fully projected to the point where they contact with the outer periphery of the inner driven member or with the concave sides of the propeller blades, as shown in Fig. 6, those portions of the liquid between said valves and the next forward propeller blades are completely trapped when said propeller blades reach contacting engagement with the outer peripheral wall of the liquid chamber, so that at this point the inner or driven member is locked to and rotates at the same speed as the outer or driving member, and the propeller blades no longer rotate on their individual axes. A subsequent slacking of the speed of the driven shaft is obtained by partially retracting the valves 50, which permits a limited escape of the trapped liquid from the forward to the rear sides of the valves 50. In this way, by a very gradual projection of the valves 50 across the annular liquid chamber, the speed of the driven or transmission shaft can be very gradually accelerated so as to thereby throw the load on the engine so slowly and gradually as to avoid any danger of stalling or "killing" the engine, as in starting a vehicle from a position of rest. Similarly, in hill-climbing, the partial retraction of the valves 50 decreases the speed of the driven or transmission shaft relatively to that of the engine shaft and correspondingly lightens the load on the engine.

It will be evident that when the valves 50 are fully projected, their forward ends or noses may directly engage the propeller blades, or may slide into engagement with or over the latter before the two clutch members are completely locked together. The manner in which the concave sides of the propeller blades permit this is diagrammatically illustrated in Fig. 14, wherein for convenience of illustration we have indicated the outer member carrying a valve 50 as stationary and the inner member carrying the propeller blades 43 as turning in a counter-clockwise direction, although, as a matter of fact, the outer member is turning in a clockwise direction and the inner member is turning more slowly in the same direction so that it is really turning backwardly relatively to the outer member (as indicated), and the propeller blade is turning on its own axis. In the first (dotted line) position of the propeller blade, the nose of the valve 50 has just engaged the upper left hand corner of the propeller blade. In the second (full line) position of the propeller blade, the nose of the valve engages the center of the concave side of the propeller blade. In the third (dotted line) position of the propeller blade, the nose of the valve is just passing off the upper right hand corner of the propeller blade. The line of curvature of the concave side of the propeller blade bears such a relation to the speed of rotation of the latter on its own axis (which in turn depends on the relative speed between the outer and inner driven members) that the nose of the valve 50 remains in sliding and substantially fluid tight contact with the concave side of the abutment blade throughout its travel over the latter, so that there is no leakage between said parts. It will thus be seen that when the valve 50 is traveling relatively to the periphery of the driven member or body that carries the propeller blades, it will engage said abutment blades with the same sliding contact as it engages the periphery of the driven member between said blades; and if partially retracted, it will have the same amount of clearance when passing over said blades that it has when passing over the periphery of the driven member between said blades.

In the construction illustrated the torque on the driving and driven shaft is balanced by providing duplicate valves 50 and propeller blades 43 at diametrically opposite points relatively to the common axis of these shafts; but it will be understood that the operative principle of the invention is fully embodied in the construction employing a single valve and one or more propeller blades when constructed and operating substantially as herein described.

Figure 8:
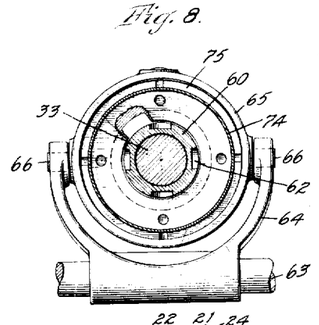
Figs. 8 and 9 are sectional views at right angles to the axis of the clutch taken on the lines 8—8 and 9—9 of Fig. 1.
Figure 9:
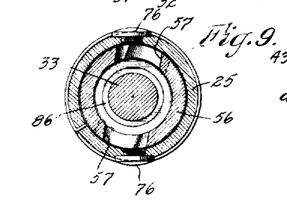

In order that when the parts of the clutch mechanism are thrown into fully engaged position so as to drive the transmission shaft at the same speed as the driving shaft, the load may be taken off the fluid clutch mechanism, we provide an auxiliary mechanical clutch that is adapted to be automatically brought into operation only when the transmission shaft is driven at the full speed of the driving shaft. This mechanism is most clearly shown in Fig. 10, wherein it will be seen that the outer end of the sleeve 60 (which it will be remembered is splined to the hub 25 of the main driving member of the fluid clutch through the studs 61 and longitudinal slots 62) is formed with a toothed clutch member 71 that, when said sleeve is moved to its outermost position shown in Fig. 1, and after it has fully connected the driving and driven parts of the fluid clutch, engages a coöperating toothed clutch member 72, the hub 73 of which is mounted on a squared portion 33' of the transmission shaft 33. The straight extensions 57' of the cam slots 57 enable the mechanical clutch members to be engaged only after the fluid clutch members have been engaged, thus avoiding danger of breaking the teeth of the auxiliary mechanical clutch members. To the clutch member 72 is secured the brake drum 34, already referred to. To protect the sleeve 60 and its longitudinal grooves 62 from dust and dirt, we preferably employ a cylindrical guard or skirt 74 that may be secured at its outer end to the outer member of the thrust bearing 67 by a ring nut 75 (Figs. 8 and 10) engaging a flange 74' on the end of the guard 74.

76 designates each of a pair of cap screws that are entered into tapped holes in the hub 25 to fill the latter, said holes being made to facilitate assembling by providing convenient means for application of the studs 59 which carry the anti-friction rollers 58.

It is, of course, essential in a device of this character to thoroughly pack the joints between relatively moving parts of the outer or main casing and the driven shaft and parts associated therewith in order to prevent leakage and waste of oil and subsequent impairment of the efficiency of the device. In Figs. 10, 11, 12, and 13 we have illustrated the details of a packing carried by the hub 55 of the oscillating sleeve 56, which prevents leakage of oil around the driven shaft 33, the sliding sleeve 60, and the oscillating sleeve 56. In these views, 77 designates a web, preferably of corrugated copper that is secured at its inner edge to the hub 55 by a ring nut 78 and carries on one side of its outer edge portion a packing ring 79 preferably of wood fiber, and on the other side of its outer edge portion a steel ring 80, the two being securely united to each other and to the web 77 by hollow rivets 81. The inner steel ring 80 bears against one side of the segment gear 54, and the packing ring 79 is pressed into engagement with the inner wall of the base of the hub 25 by coiled springs 82 housed in pockets 83 formed in the outer face of the segment gear 54. To prevent torsional strain on the web or carrying member 77 of the packing, certain of the rivets 81 extend into holes 84 (Fig. 13) in the segment gear 54 that are located intermediate the sockets 83. A similar arrangement is employed for packing the joint between the hub 55 and the outer face of the wide flange or disk 36 on the inner end of the driven shaft 33. Here 85 designates the corrugated copper web that is clamped to the inner face of the hub 55 by the flange 86' of a bushing member 86 that surrounds the shaft 33 and has threaded engagement with the hub 55. 87 designates the wood fiber packing ring, 88 the steel ring, 89 the rivets, and 90 the springs housed in sockets 91. 92, Fig. 12, designates the intermediate holes or sockets that are engaged by the inner ends of alternate rivets 89 to take the torsional strain off the web member 85. The circumferentially corrugated form of the packing carrying webs or disks 77 and 85 is important, since it affords such a degree of flexibility as permits the packing rings themselves to be forced by the springs into fluid tight engagement with the surfaces which they contact, without involving canting and uneven wear of said packing rings such as would be the case if plain flat carrying webs were employed, and unaffected by lateral vibration and wabbling of the driven shaft and sleeves surrounding the same.

Referring to Fig. 6, 93 designates each of a pair of ports that connect the central annular chamber with the groove or channel 29 in one or both of the flanges 28 to provide for an equalization of the pressures in the fluids trapped between the valves 50 and the propeller blades 43 when the main clutch members are operatively engaged with each other, this equalization or balancing of pressures taking place through the fluid contained in one or both of the grooves or channels 29, and preventing unequal wear on the central bearing of the driven member.

Figure 14:
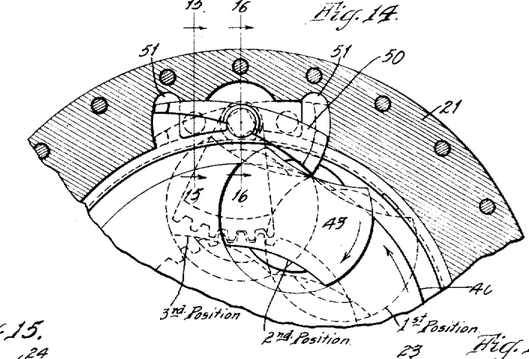
Fig. 14 is a fragmentary sectional view through a portion of the peripheral wall of the driving member, showing one of the controlling valves carried by the driving clutch member in full lines in locking position and in dotted lines in release position, and also illustrating diagrammatically the manner in which the segmental propeller blades pass said controlling valve in sliding contact therewith during relative rotation of the main driving and driven clutch members.
Figure 15:
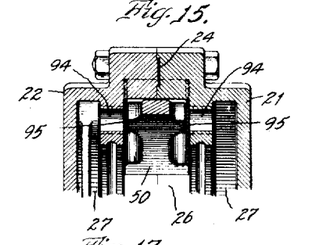
Figs. 15 and 16 are sectional details on the corresponding lines of Fig. 14.
Figure 17:
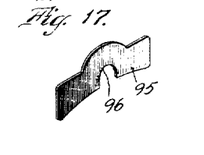
Fig. 17 is a perspective detail of a valve strip that controls certain ports between the central and side oil chambers of the outer driving member or clutch casing.

Referring to Figs. 14 and 15, it will be observed that the side fluid chambers 27 communicate with the central fluid chambers 26 through ports 94 connecting the side fluid chambers 27 with the chambers or pockets 51 that house the valves 50 on opposite sides of the bearings 52 of the latter. These ports 94 permit return to the central chamber of any liquid that may be forced out of the latter through the joints between the flanges 28 and 39' and 40'. 95 designates each of a pair of thin flat strips, Figs. 15 and 17, that, by a central notch 96, straddle the inner ends of the trunnions 52 of the valve and overlie the inner ends of the ports 94, these members having a sufficient side play to act as check valves permitting free passage of the fluid from the side chambers 27 to the valve pockets 51 but checking flow in the opposite direction. By this means the central chamber will be maintained filled with oil, since oil in the side chambers will, through centrifugal force during operation of the clutch, be thrown to the periphery of the chambers 27 and passed through the ports 94 to the central chamber.

It may also be noted that provision is made for effecting lubrication of the members of the planetary gearing from the body of oil within the clutch. For instance, the gearings of the propeller blades may be lubricated through ducts 97 in the skeleton frame member 39, and the intermediate or idler gears 47 are lubricated at their bearings through radial ducts 98 (Fig. 7) formed therein.

At 99 (Fig. 1) we have shown a duct formed in the hub of the casing member 21 that communicates with the axial duct 32 of the hub 30 and leads to the atmosphere, said duct 99 being controlled by a valve 100 normally held closed by a light spring 101. This device forms an automatic escape for any air or gas that may be generated within the clutch casing as a result of the constant agitation and churning which the body of oil or other liquid undergoes, it being obvious that the air or gas within the clutch casing must reach a pressure sufficient to overcome the pressure of the spring 101 in order to unseat the valve 100 and escape from the clutch casing.

It is believed that the manner in which our invention accomplishes the stated objects thereof will be clear to those skilled in this art from the foregoing description. By reason of the fact that all parts which have sliding contact with each other are bathed in oil, it will be seen that the wear from friction is very small. The principal difficulty heretofore experienced with clutches of this character is to confine the body of liquid successfully and prevent its leakage and waste owing to the high pressures to which it is subjected. The herein described packing effectively overcomes this difficulty. By employing a plurality of clutch-locking devices at diametrically opposite points around the common axis of the driving and driven shafts the wear on the bearings is evenly distributed; and by proper manipulation of the manually controlled throttle valves 50 practically any desired speed ratio between the driving and driven shafts is obtainable. When fully coupled the mechanical clutch comes automatically into play and takes the strain off the fluid clutch.

Without limiting ourselves to the particular embodiment of the invention shown and described,

We claim:

1. In a fluid clutch, the combination of a hollow rotary driving member, a rotary driven member within and circumferentially spaced from said driving member to form an annular fluid chamber, a body of liquid filling said fluid chamber, a plurality of propeller blades rotatably mounted in said driven member adapted at a point in its rotation to bisect said fluid chamber, means for rotating said propeller blades from said driving member during a relative turning movement between said driving and driven members, a plurality of valves mounted in said driving member, means for moving said valve to a position partially or wholly bisecting said fluid chamber in rear of said propeller blades, and means permitting passage of fluid between the bisected portions of the fluid chamber so as to equalize the pressures therein.

2. In a fluid clutch, the combination of a hollow rotary driving member, a rotary driven member within and circumferentially spaced from said driving member to form an annular fluid chamber, a segmental propeller blade having concave sides and arcuate ends rotatably mounted in the peripheral portion of said driven member and adapted at one or more points in its rotation to bisect said fluid chamber, means for rotating the propeller blade during and in fixed ratio to a revolution of said driving member around said driven member, and a valve mounted in said driving member adapted to be moved to a position to partially or wholly bisect said fluid chamber in rear of said propeller blade.

3. In a fluid clutch, the combination of a hollow rotary driving member, a rotary driven member within and circumferentially spaced from said driving member to form an annular fluid chamber, a body of liquid filling said fluid chamber, a segmental propeller blade having concave sides and arcuate ends rotatably mounted in the peripheral portion of said driven member and adapted at one or more points in its rotation to bisect said fluid chamber, a planetary gear train intermediate said driving member and said propeller blade, and a valve mounted in said driving member adapted to be moved to a position wherein it partially or wholly bisects said fluid chamber in rear of said propeller blade.

4. In a fluid clutch, the combination of a hollow rotary driving member, a rotary driven member within and circumferentially spaced from said driving member so as to form an annular fluid chamber, said members having coöperating annular flanges or the like, a plurality of propeller blades mounted in said driven member, means for causing, under a relative rotation of said members, the propeller blade to be projected across and bisect said fluid chamber, and a plurality of valves mounted in said driving member movable to a position partially or wholly bisecting said fluid chamber, said annular flanges containing ports connecting the several portions of the fluid chamber so as to equalize the fluid pressures in said bisected portions of the fluid chamber bisected by the valves.

5. In a fluid clutch, an annular fluid chamber having relatively rotatable outer and inner peripheral walls, in combination with a body of liquid filling said chamber, a plurality of valves in the outer wall adapted to be projected across said chamber, and a propeller blade mounted in and bodily carried by the inner wall and rotatable on its own axis in the plane of said chamber, said propeller blade having opposed arcuate ends and concave sides, and means for rotating said blade during relative rotation of said walls.

6. In a fluid clutch, an annular fluid chamber having relatively rotatable outer and inner peripheral walls, in combination with a body of liquid filling said chamber, a plurality of valves in the outer wall adapted to be projected across said chamber, a segmental propeller blade mounted in and bodily carried by the inner wall and rotatable on its own axis in the plane of said chamber, said propeller blade having opposed arcuate ends adapted, during relative rotation of said walls, to be projected across said chamber, and intermediate concave sides to enable said propeller blade to clear said valves, and means for rotating the propeller blade during relative rotation of said walls.

7. In a fluid clutch, an annular fluid chamber having relatively rotatable outer and inner peripheral walls, in combination with a body of liquid filling said chamber, a pair of diametrically opposed valves in the outer wall adapted to be projected across said chamber, a pair of diametrically opposed segmental propeller blades mounted in and bodily carried by the inner wall and rotatable on their individual axes in the plane of said chamber, and means for rotating said blade during and in fixed ratio to relative rotation between said inner and outer walls, said propeller blades each having opposed peripheral portions adapted, during relative rotation of said walls, to be projected across said chamber, and intermediate peripheral portions so formed as to enable said propeller blades to clear said valves.

8. In a fluid clutch, in combination, an outer casing constituting a driving member formed with a pair of peripherally channeled internal flanges, and an inner driven member having peripheral flanges in register with the channeled flanges of said driving member, said members and their coöperating flanges forming a central annular fluid chamber and side fluid chambers on either side of said central chamber, means carried by said driving and driven members on opposite sides of the axis thereof adapted to coöperate with a body of liquid in said central annular chamber to couple said members for simultaneous rotation at equal or different speeds, and means operating through the channels of said flanges permitting an equalization of fluid pressures in said central chamber on opposite sides of the axis thereof.

9. In combination, axially alined driving and driven shafts, a hollow fluid clutch driving member fast on said driving shaft, a fluid clutch driven member within and peripherally spaced from said driving member and fast on said driven shaft, a confined body of liquid between said members, means for coupling said fluid clutch members through said body of liquid, a sliding sleeve on said driven shaft splined to said fluid clutch driving member and carrying a laterally projecting stud and a mechanical clutch driving member, a mechanical clutch driven member fast on said driven shaft, an oscillating sleeve surrounding said sliding sleeve and formed with a slot engaged by said stud, said slot having an inclined or cam portion and a straight portion beyond said inclined portion, and means actuating said fluid clutch coupling means actuated by said oscillating sleeve during the first part of the endwise travel of said sliding sleeve and prior to the engagement of said mechanical clutch members.

10. In a fluid clutch, an annular fluid chamber having relatively rotatable outer and inner peripheral walls, in combination with a body of liquid filling said chamber, a pair of diametrically opposed valves in the outer wall adapted to be projected across said chamber, a pair of diametrically opposed propeller blades in the inner wall adapted to be projected across said chamber during relative rotation of said walls, and means for maintaining an equality of pressures in diametrically opposed portions of said annular fluid chamber.

11. In a fluid clutch, an annular fluid chamber having relatively rotatable outer and inner peripheral walls, and auxiliary fluid chambers on either side of said annular fluid chamber, in combination with a body of liquid filling said chamber, a pair of diametrically opposed valves in the outer wall adapted to be projected across said annular chamber, a pair of diametrically opposed propeller blades in the inner wall adapted to be projected across said annular chamber during relative rotation of said walls, and valve controlled ports connecting said side and central chambers permitting a return flow from the former to the latter of liquid forced out of said central chamber under pressure of said valves.

12. In a fluid clutch, an annular fluid chamber having relatively rotatable outer and inner peripheral walls, a plurality of circumferentially spaced valves in the outer wall adapted to be projected across said chamber, a plurality of propeller members in the inner wall adapted to be projected across said chamber, means for projecting the propeller members across said chamber during relative rotation of said walls, and means for maintaining an equality of pressure in the portions of said annular fluid chamber divided by said propeller members.

AXEL HJ. ASPROOTH.
H. H. BENSON.

during relative rotation of said walls, to be projected across said chamber, and intermediate peripheral portions so formed as to enable said propeller blades to clear said valves.

8. In a fluid clutch, in combination, an outer casing constituting a driving member formed with a pair of peripherally channeled internal flanges, and an inner driven member having peripheral flanges in register with the channeled flanges of said driving member, said members and their coöperating flanges forming a central annular fluid chamber and side fluid chambers on either side of said central chamber, means carried by said driving and driven members on opposite sides of the axis thereof adapted to coöperate with a body of liquid in said central annular chamber to couple said members for simultaneous rotation at equal or different speeds, and means operating through the channels of said flanges permitting an equalization of fluid pressures in said central chamber on opposite sides of the axis thereof.

9. In combination, axially alined driving and driven shafts, a hollow fluid clutch driving member fast on said driving shaft, a fluid clutch driven member within and peripherally spaced from said driving member and fast on said driven shaft, a confined body of liquid between said members, means for coupling said fluid clutch members through said body of liquid, a sliding sleeve on said driven shaft splined to said fluid clutch driving member and carrying a laterally projecting stud and a mechanical clutch driving member, a mechanical clutch driven member fast on said driven shaft, an oscillating sleeve surrounding said sliding sleeve and formed with a slot engaged by said stud, said slot having an inclined or cam portion and a straight portion beyond said inclined portion, and means actuating said fluid clutch coupling means actuated by said oscillating sleeve during the first part of the endwise travel of said sliding sleeve and prior to the engagement of said mechanical clutch members.

10. In a fluid clutch, an annular fluid chamber having relatively rotatable outer and inner peripheral walls, in combination with a body of liquid filling said chamber, a pair of diametrically opposed valves in the outer wall adapted to be projected across said chamber, a pair of diametrically opposed propeller blades in the inner wall adapted to be projected across said chamber during relative rotation of said walls, and means for maintaining an equality of pressures in diametrically opposed portions of said annular fluid chamber.

11. In a fluid clutch, an annular fluid chamber having relatively rotatable outer and inner peripheral walls, and auxiliary fluid chambers on either side of said annular fluid chamber, in combination with a body of liquid filling said chamber, a pair of diametrically opposed valves in the outer wall adapted to be projected across said annular chamber, a pair of diametrically opposed propeller blades in the inner wall adapted to be projected across said annular chamber during relative rotation of said walls, and valve controlled ports connecting said side and central chambers permitting a return flow from the former to the latter of liquid forced out of said central chamber under pressure of said valves.

12. In a fluid clutch, an annular fluid chamber having relatively rotatable outer and inner peripheral walls, a plurality of circumferentially spaced valves in the outer wall adapted to be projected across said chamber, a plurality of propeller members in the inner wall adapted to be projected across said chamber, means for projecting the propeller members across said chamber during relative rotation of said walls, and means for maintaining an equality of pressure in the portions of said annular fluid chamber divided by said propeller members.

AXEL HJ. ASPROOTH.
H. H. BENSON.

---

Corrections in Letters Patent No. 1,195,956.

It is hereby certified that in Letters Patent No. 1,195,956, granted August 29, 1916, upon the application of Axel Hj. Asprooth and Harry H. Benson, of Rockford, Illinois, for an improvement in "Fluid-Clutches," errors appear in the printed specification requiring correction as follows: Page 6, line 83, claim 4, after the word "chamber" insert the words *bisected by the valves;* same page and claim, line 85, after the word "chamber" insert a period and strike out all to the end of line 86; and that the said Letters Patent should be read with these corrections therein that the same may conform to the record of the case in the Patent Office.

Signed and sealed this 3d day of October, A. D., 1916.

[SEAL.]

F. W. H. CLAY,
*Acting Commissioner of Patents.*

It is hereby certified that in Letters Patent No. 1,195,956, granted August 29, 1916, upon the application of Axel Hj. Asprooth and Harry H. Benson, of Rockford, Illinois, for an improvement in "Fluid-Clutches," errors appear in the printed specification requiring correction as follows: Page 6, line 83, claim 4, after the word "chamber" insert the words *bisected by the valves;* same page and claim, line 85, after the word "chamber" insert a period and strike out all to the end of line 86; and that the said Letters Patent should be read with these corrections therein that the same may conform to the record of the case in the Patent Office.

Signed and sealed this 3d day of October, A. D., 1916.

[SEAL.]

F. W. H. CLAY,
*Acting Commissioner of Patents.*